US012656798B2

(12) United States Patent
Ferlito et al.

(10) Patent No.: US 12,656,798 B2
(45) Date of Patent: Jun. 16, 2026

(54) LOW-DROPOUT VOLTAGE REGULATOR CIRCUIT WITH MODE DEPENDENT CURRENT SINKING AND CORRESPONDING METHOD OF OPERATION

(71) Applicant: STMicroelectronics S.r.l., Agrate Brianza (IT)

(72) Inventors: Umberto Ferlito, Catania (IT); Michele Vaiana, San Giovanni la Punta (IT); Giuseppe Bruno, Paterno' (IT); Alfio Dario Grasso, Riposto (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 227 days.

(21) Appl. No.: 18/224,897

(22) Filed: Jul. 21, 2023

(65) Prior Publication Data

US 2024/0036595 A1 Feb. 1, 2024

(30) Foreign Application Priority Data

Jul. 29, 2022 (IT) ........................ 102022000016128

(51) Int. Cl.
*G05F 1/565* (2006.01)
*G05F 1/575* (2006.01)
*G05F 3/26* (2006.01)

(52) U.S. Cl.
CPC .............. *G05F 1/565* (2013.01); *G05F 1/575* (2013.01); *G05F 3/262* (2013.01)

(58) Field of Classification Search
CPC ........... G05F 1/565; G05F 1/575; G05F 3/262
See application file for complete search history.

(56) References Cited

U.S. PATENT DOCUMENTS 6,690,147 B2 * 2/2004 Bonto ..................... G05F 1/575 323/280
10,133,289 B1 * 11/2018 Ankamreddi ........... G05F 1/575
(Continued)

FOREIGN PATENT DOCUMENTS

CN 103376816 A 10/2013
CN 106451386 A 2/2017
(Continued)

OTHER PUBLICATIONS

IT Search Report and Written Opinion for priority application, IT Appl. 102022000016128, report dated Feb. 20, 2023, 23 pgs.
(Continued)

*Primary Examiner* — Lakaisha Jackson
(74) *Attorney, Agent, or Firm* — Crowe & Dunlevy LLC

(57) ABSTRACT

A low-drop out voltage regulator includes a pass element arranged between an input terminal and an output terminal, a feedback network configured to produce a feedback voltage derived from an output voltage, and an error amplifier configured to drive the pass element as a function of a difference between the feedback voltage and a reference voltage. An output transistor coupled in series with the pass element is controlled by a mode selection circuit. In response to assertion of a mode selection signal, the mode selection circuit turns on the output transistor to sink a current with a controlled magnitude from the output node. In response to de-assertion of the mode selection signal, the mode selection circuit sinks a current with a controlled magnitude from a control terminal of the output transistor to turn off the output transistor at a controlled rate.

20 Claims, 3 Drawing Sheets

(56) References Cited

U.S. PATENT DOCUMENTS

| | | | | |
|---|---|---|---|---|
| 10,496,115 | B2 | 12/2019 | Hung et al. | |
| 2014/0055110 | A1 | 2/2014 | Richter et al. | |
| 2014/0266114 | A1 | 9/2014 | Chern et al. | |
| 2017/0038783 | A1 * | 2/2017 | Chen | G05F 1/46 |
| 2020/0153338 | A1 * | 5/2020 | Ribarich | H02M 1/08 |
| 2020/0286574 | A1 | 9/2020 | Kunz et al. | |

FOREIGN PATENT DOCUMENTS

| | | | |
|---|---|---|---|
| CN | 106558987 | A | 4/2017 |
| CN | 110874110 | A | 3/2020 |

OTHER PUBLICATIONS

Lee, Yu-Huei, et al.: "A 65nm Sub-1V Multi-Stage Low-Dropout (LDO) Regulator Design for SoC Systems," IEEE, 2010, 4 pgs.

Al-Shyoukh, Mohammad, et al.: "A Transient-Enhanced Low-Quiescent Current Low-Dropout Regulator With Buffer Impedance Attenuation," IEEE Journal of Solid-State Circuits, vol. 42, No. 8, Aug. 2007, 11 pgs.

Saberkari, Alireza, et al.: "Fast Transient Current-Steering CMOS LDO Regulator Based on Current Feedback Amplifier," Integration, the VLSI Journal 46 (2013) 165-171.

CN First Office Action and Search Report for counterpart CN Appl. No. 202310940007.0, report dated Mar. 9, 2026, 13 pgs.

* cited by examiner

LOW-DROPOUT VOLTAGE REGULATOR CIRCUIT WITH MODE DEPENDENT CURRENT SINKING AND CORRESPONDING METHOD OF OPERATION

PRIORITY CLAIM

This application claims the priority benefit of Italian Application for Patent No. 102022000016128, filed on Jul. 29, 2022, the content of which is hereby incorporated by reference in its entirety to the maximum extent allowable by law.

TECHNICAL FIELD

The description relates to linear voltage regulators, in particular to low-dropout (LDO) voltage regulators.

BACKGROUND

Low-dropout linear voltage regulator circuits are analog intellectual property (IP) blocks commonly used in modern electronic systems. Linear regulators are usually in the form of integrated circuits that step a voltage down from a higher voltage to a lower voltage without the need of an (external) inductor, contrarily to other step-down DC-DC converters such as switching buck converters.

In particular, LDO regulators may be used within complex electronic systems, such as Systems-on-Chip (SoC) for Internet-of-Things (IoT) applications, to provide a regulated supply voltage to one or more components of such systems.

By way of example, FIG. 1 is a circuit block diagram exemplary of a system-on-chip (SoC) 10 that may be used, for instance, in Internet-of-Things (IoT) applications. The SoC 10 may include one or more of: processing circuitry (Proc) 102 (e.g., a microprocessor and/or another applications processor) configured to control operation of the SoC 10; a memory (M) 104 (e.g., a storage flash memory) configured to store instructions and/or data for operating the SoC 10; a power management (PM) circuit 106 couplable to an (external) power source 12 such as a battery, and configured to deliver power to the internal components of the SoC 10 and/or to the peripherals coupled thereto; a radio-frequency (RF) transceiver circuit 108 couplable to an (external) antenna 14, and configured to transmit and/or receive signals to/from the antenna 14 to communicate with other wireless devices, e.g., in an IoT network; a sensor interface (SI) circuit 110 couplable to one or more external sensors 16, and configured to deliver power to the sensors 16 and exchange data with the sensors 16; and a user interface (UI) circuit 112 couplable to one or more input/output peripherals such as a keyboard **18*a* and/or a display 18*b***.

In various applications as exemplified in FIG. 1, an LDO regulator may be used to power a phase-locked loop (PLL) of the transceiver circuit 108, and/or to power the digital circuitry of the SoC 10 (e.g., the processing circuitry 102 and/or the memory 104), and/or to power the sensors 16. Advantageously, the supply voltage produced by an LDO regulator may be stable and noiseless, if compared to the voltage produced by switching DC-DC regulators that is usually affected by a ripple.

FIG. 2 is a circuit block diagram exemplary of a conventional LDO voltage regulator 20. The LDO regulator 20 includes a pair of input terminals (e.g., a positive input terminal 200 and a reference terminal 202 at a reference voltage or ground voltage $V_{GND}$ such as 0 V) configured to receive an input voltage $V_{IN}$ therebetween, and a pair of output terminals (e.g., a positive output terminal 204 and the reference terminal 202, which may be common to the input and the output of circuit 20) configured to produce a regulated output voltage $V_{OUT}$ therebetween. The LDO regulator 20 includes a feedback network configured to produce a feedback voltage $V_{FB}$ indicative of (e.g., proportional to) the output voltage $V_{OUT}$. For instance, the feedback network may include a (resistive) voltage divider including a first resistor R1 and a second resistor R2 coupled in series between nodes 204 and 202, whereby the feedback voltage $V_{FB}$ is produced at a node 206 intermediate the two resistors R1 and R2. Alternatively, the feedback network R1, R2 may be off-chip (i.e., implemented with off-chip discrete resistors R1 and R2) and the LDO regulator 20 may include a feedback input terminal 206 configured to be coupled to the intermediate node of the off-chip feedback network. The LDO regulator 20 includes an error amplifier 208 having a first (e.g., non-inverting) input terminal configured to receive the feedback voltage $V_{FB}$ (e.g., coupled to node 206) and a second (e.g., inverting) input terminal configured to receive a reference voltage $V_{REF}$. The reference voltage $V_{REF}$ may be produced, for instance, by a circuit (not visible in the figures annexed herein) integrated within the semiconductor chip of the LDO regulator 20, and may have a low sensitivity with respect to temperature variations and/or supply voltage variations. The error amplifier 208 has a gain $A_V$ and thus produces a drive signal $V_{DRV}$ as a function of (e.g., proportionally to) the difference between the feedback voltage $V_{FB}$ and the reference voltage $V_{REF}$ (e.g., $V_{DRV}=A_V\cdot(V_{FB}-V_{REF})=A_V\cdot V_{ERR}$, where $V_{ERR}$ is the error signal). The LDO regulator 20 includes a pass element 210 (e.g., a current-passing component such as a pass transistor) arranged between the input node 200 and the output node 204. The pass element 210 receives the drive signal $V_{DRV}$ as a control signal, so that the conductivity of the pass element 210 is controlled as a function of the value of the drive signal $V_{DRV}$ to increase its resistance when the output voltage $V_{OUT}$ has to be lowered or to decrease its resistance when the output voltage $V_{OUT}$ has to be raised. As exemplified in FIG. 2, the pass element 210 may include a p-channel power metal-oxide-semiconductor field-effect transistor (MOSFET) having a source terminal coupled to node 200, a drain terminal coupled to node 204, and a gate terminal coupled to the output terminal of the error amplifier 208. Alternatively, the pass element 210 may include an n-channel power MOSFET having a drain terminal coupled to node 200, a source terminal coupled to node 204, and a gate terminal coupled to the output terminal of the error amplifier 208. The pass element typically has large dimensions so as to be able to provide the output current required by the (external) regulated load $R_L$ connected to node 204. Additionally, as exemplified in FIG. 2, an external load capacitor $C_L$ may be coupled in parallel to the load $R_L$ (e.g., between the output node 204 and the ground node 202) to act as a charge storage device that responds rapidly to instantaneous current demands from the load $R_L$.

In various applications, the design of the LDO regulator represents an important task. In particular, the way in which the error amplifier 208 is designed has an impact on the performance of the whole regulator, insofar as the quiescent current consumption, the drop-out region, the transient response and the efficiency are concerned. Specifically, in portable systems, there is a need of reducing the current consumption in order to extend the battery life; in this scenario, LDO regulators play an important role since the quiescent current consumption is mainly set by these circuits. Moreover, requirements in terms of load regulation, line regulation and reduced overshoot and undershoot should also be met.

Maintaining a low power consumption results in reducing the energy provided by the battery (e.g., battery 12 in FIG. 1), and therefore increasing both the duration of a single charge and the battery lifetime. However, in an LDO regulator, the current consumption cannot be too small since a certain bandwidth (and thus a certain biasing current) has to be provided. Moreover, the requirement to maintain overshoot and undershoot within a certain range (usually to prevent high electric fields across the thin gate oxide) imposes the use of a large output capacitor $C_L$, that acts as a charge provider during the initial phases of current demand by the load. In off-chip applications, it may be possible to use discrete capacitors $C_L$ having a capacitance of several nanoFarads (1 nF=$10^{-9}$ F), but in fully integrated applications it may only be possible to integrate capacitors $C_L$ having a capacitance of some hundreds of picoFarads (1 pF=$10^{-12}$ F), at the expense of a large area occupation.

Some solutions have been proposed to improve the settling time and to reduce overshoot and undershoot of LDO regulators, as discussed in the following documents (all of which are incorporated herein by reference):

[1] Y. Lee and K. Chen, "A 65 nm sub-1V multi-stage low-dropout (LDO) regulator design for SoC systems," 2010 53rd IEEE International Midwest Symposium on Circuits and Systems, 2010, pp. 584-587, doi: 10.1109/MWSCAS.2010.5548893;

[2] A. Saberkari, E. Alarcon, and S. Shokouhi, "Fast transient current-steering CMOS LDO regulator based on current feedback amplifier," Integration, the VLSI journal, vol. 46, no. 2, pp. 165-171, March 2013, doi: 10.1016/j.vlsi.2012.02.001; and

[3] M. Al-Shyoukh, H. Lee and R. Perez, "A Transient-Enhanced Low-Quiescent Current Low-Dropout Regulator With Buffer Impedance Attenuation," in IEEE Journal of Solid-State Circuits, vol. 42, no. 8, pp. 1732-1742, August 2007, doi: 10.1109/JSSC.2007.900281.

However, such known solutions show a quiescent current in the order of several microAmperes (1 μA=$10^{-6}$ A) to maintain an acceptable transient response as well as overshoot/undershoot values.

Therefore, there is a need in the art to provide improved linear voltage regulators having a low current consumption, low overshoot and undershoot during output transients, and low settling time.

There is a need in the art to contribute in providing such improved linear voltage regulators.

SUMMARY

One or more embodiments may relate to a voltage regulator circuit.

One or more embodiments may relate to a corresponding method of operating a voltage regulator circuit.

According to a first aspect of the present description, a voltage regulator circuit includes a first input terminal and a second input terminal configured to receive an input voltage therebetween. The voltage regulator circuit includes a first output terminal and a second output terminal configured to produce a regulated output voltage therebetween. The second input terminal and the second output terminal are coupled to a ground node. The voltage regulator circuit includes a feedback network configured to produce a feedback voltage indicative of the regulated output voltage. The voltage regulator circuit includes an error amplifier configured to produce a drive signal as a function of a difference between the feedback voltage and a reference voltage. The voltage regulator circuit includes a pass element arranged between the first input terminal and the first output terminal configured to receive the drive signal. The conductivity of the pass element is modulated as a function of the drive signal. The voltage regulator circuit includes an output transistor arranged between the first output node and the ground node. The voltage regulator circuit includes a mode selection circuit configured to receive a mode selection signal and to control the output transistor as a function thereof. In response to the mode selection signal being asserted, the mode selection circuit turns on the output transistor to sink a current with a controlled magnitude from the first output node. In response to the mode selection signal being de-asserted, the mode selection circuit sinks a current with a controlled magnitude from a control terminal of the output transistor to turn off the output transistor at a controlled rate.

One or more embodiments may thus facilitate providing a linear voltage regulator having a low current consumption, as well as low overshoot and undershoot during output transients.

In one or more embodiments, the mode selection circuit includes a first current conduction path including a first current source configured to source a first current, an enabling transistor, and a diode-connected transistor arranged in series between a power supply node and the ground node. The enabling transistor is configured to receive the mode selection signal at a respective control terminal. The enabling transistor is switched to a conductive state in response to the mode selection signal being asserted and to a non-conductive state in response to the mode selection signal being de-asserted. A control terminal of the diode-connected transistor is coupled to a control terminal of the output transistor.

In one or more embodiments, the mode selection circuit includes a set of coupling transistors having their current conduction paths arranged in series between the control terminal of the diode-connected transistor and the control terminal of the output transistor. The coupling transistors are configured to receive the mode selection signal at their respective control terminals. The coupling transistors are switched to a conductive state in response to the mode selection signal being asserted and to a non-conductive state in response to the mode selection signal being de-asserted.

In one or more embodiments, the mode selection circuit includes a capacitor coupled between a control terminal of the enabling transistor and the ground node.

In one or more embodiments, the mode selection circuit includes a gate-controlling transistor having its current conduction path arranged between the control terminal of the diode-connected transistor and the ground node. The gate-controlling transistor is configured to receive the complement of the mode selection signal at a respective control terminal. The gate-controlling transistor is switched to a conductive state in response to the mode selection signal being de-asserted and to a non-conductive state in response to the mode selection signal being asserted.

In one or more embodiments, the mode selection circuit includes a current mirror arrangement configured to selectively sink a second current from the control terminal of the output transistor in response to the mode selection signal being de-asserted.

In one or more embodiments, the mode selection circuit includes a further enabling transistor having its current conduction path arranged between the current mirror arrangement and the control terminal of the output transistor. The further enabling transistor is configured to receive the complement of the mode selection signal at a respective control terminal. The further enabling transistor is switched to a conductive state in response to the mode selection signal being de-asserted and to a non-conductive state in response to the mode selection signal being asserted.

In one or more embodiments, the mode selection circuit includes a further gate-controlling transistor having its current conduction path arranged between a control terminal of the current mirror arrangement and the ground node. The further gate-controlling transistor is configured to receive the mode selection signal at a respective control terminal. The further gate-controlling transistor is switched to a conductive state in response to the mode selection signal being asserted and to a non-conductive state in response to the mode selection signal being de-asserted.

In one or more embodiments, the voltage regulator circuit includes a capacitor coupled between a control terminal of the output transistor and a control terminal of the pass element.

In one or more embodiments, the voltage regulator circuit includes an output capacitor coupled between the first output node and the second output node.

According to another aspect of the present description, a method of operating a voltage regulator circuit includes: receiving an input voltage between the first input terminal and the second input terminal; producing a regulated output voltage between the first output terminal and the second output terminal; producing a feedback voltage indicative of the regulated output voltage at the feedback network; producing a drive signal as a function of a difference between the feedback voltage and a reference voltage at the error amplifier; receiving the drive signal at the pass element, modulating the conductivity of the pass element as a function of the drive signal; receiving, at the mode selection circuit, a mode selection signal and controlling the output transistor as a function thereof; in response to the mode selection signal being asserted, turning on the output transistor to sink a current with a controlled magnitude from the first output node; and in response to the mode selection signal being de-asserted, sinking a current with a controlled magnitude from a control terminal of the output transistor to turn off the output transistor at a controlled rate.

BRIEF DESCRIPTION OF THE DRAWINGS

One or more embodiments will now be described, by way of example only, with reference to the annexed figures, wherein.

DETAILED DESCRIPTION

Figure 1:
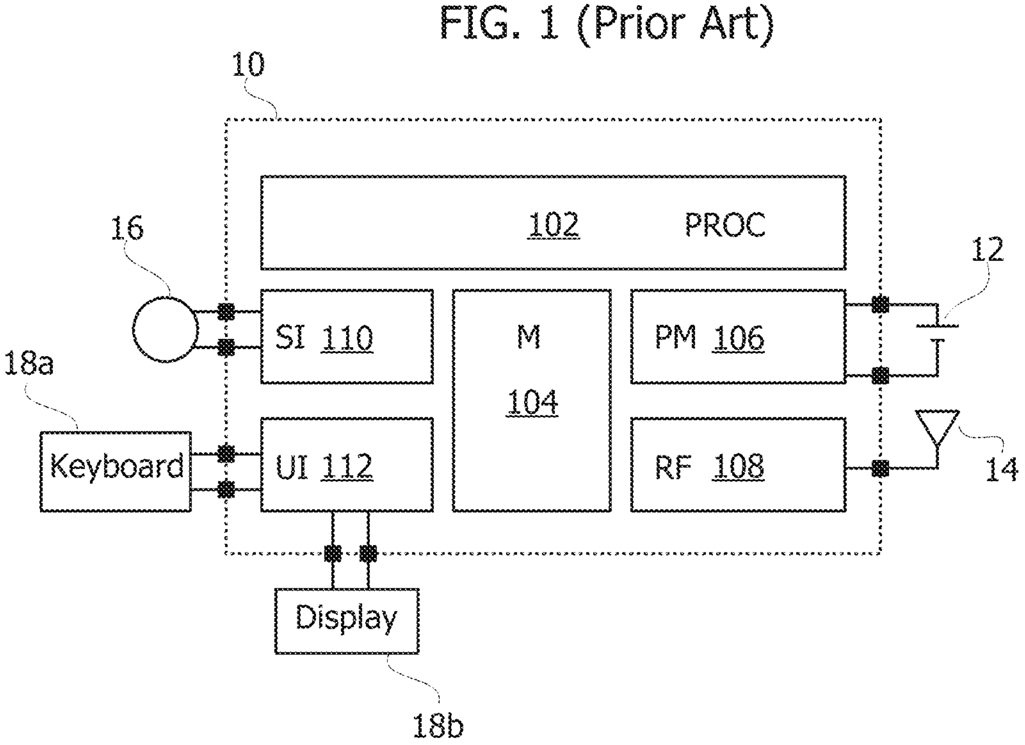
FIG. 1 (Prior Art)
FIG. 1, previously presented, is a circuit block diagram exemplary of a system-on-chip (SoC) for use, for instance, in internet-of-things (IoT) applications.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

As anticipated, an LDO voltage regulator according to one or more embodiments may aim at reducing current consumption, settling time, overshoot, and undershoot. In particular, one or more embodiments may satisfy one or more of the following specifications:

- a low consumption of quiescent current (e.g., approximately 150 nA, 1 nA=$10^{-9}$ A) when there is no current demand by the load (which, in some applications, can be considered to be about $\overline{I_{RMS}}\cong 100$ μA); the quiescent current budget of an LDO regulator is determined by the sum of the bias currents of the error amplifier, of the voltage reference and of the current reference;
- an output voltage equal to approximately 1.2 V, with maximum overshoot of 1.32 V and minimum overshoot of 0.85 V during output transients; and
- a settling time in the order of hundreds of microseconds (1 μs=$10^{-6}$ s).

In one or more embodiments, an LDO voltage regulator is configured to operate in two different modes:

- a low-power mode, in which the load is in the OFF state (e.g., no current is sunk by the load), where the voltage regulator has (only) to provide a stable output voltage (e.g., of approximately 1.2 V), without the need for the error amplifier to operate with a large bandwidth insofar as no output transients occur; and
- a high-power mode, in which the load is in the ON state (e.g., a current is sunk by the load), where operation of the error amplifier becomes faster (e.g., with a larger bandwidth) by relying on a smart digital interface, and where the architecture of the output stage of the voltage regulator is changed so as to reduce undershoot and overshoot during load transients.

Figure 2:
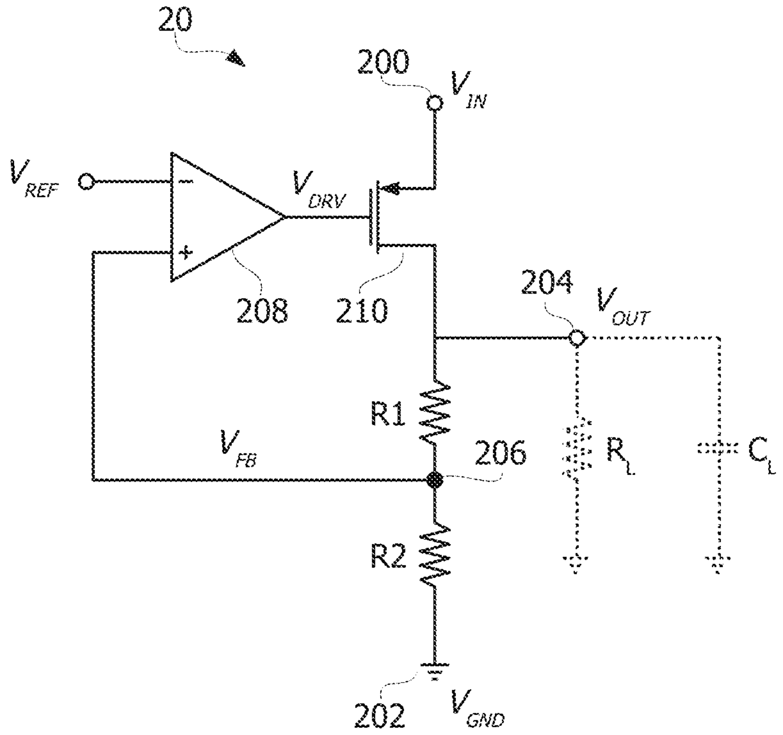
FIG. 2 (Prior Art)
FIG. 2, previously presented, is a circuit block diagram exemplary of an LDO voltage regulator.
Figure 3:
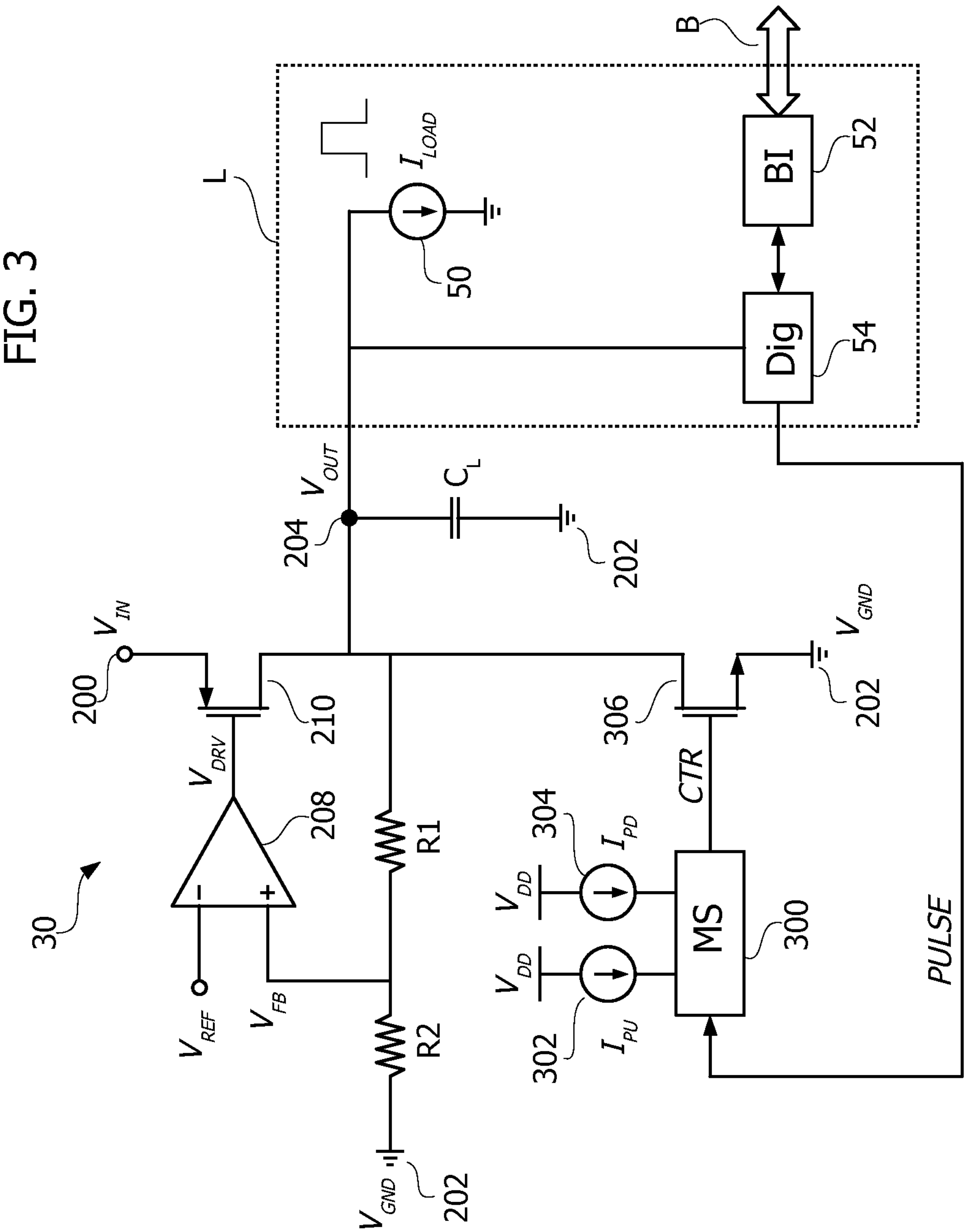
FIG. 3 is a circuit block diagram exemplary of an LDO voltage regulator according to one or more embodiments of the present description.

FIG. 3 is a circuit block diagram exemplary of an LDO voltage regulator 30 that operates as discussed above. The LDO voltage regulator 30 includes substantially the same components of a conventional LDO voltage regulator as exemplified in FIG. 2 (e.g., an error amplifier 208, a pass element 210, a feedback network R1, R2) and produces the regulated output voltage $V_{OUT}$ at the output node 204. A load L is coupled to the output node 204 and, when in operation, sinks a load current $I_{LOAD}$ from node 204. An output capacitor (e.g., an integrated capacitor) $C_L$ is coupled between the output node 204 and the ground node 202.

As exemplified in FIG. 3, the load L supplied by the LDO regulator 30 is schematically indicated as a current source 50 that sinks a load current $I_{LOAD}$ from node 204. The load L may operate as a slave device and may receive, via a bus interface (BI) 52 coupled to a communication bus B, commands from a master device coupled to the bus B (not visible in the figures annexed herein), which determine the operation of the slave device or load L. As a result, the load L may turn to an active state (e.g., turn on) and sink an impulsive current $I_{LOAD}$ from node 204. Additionally, the load slave device L includes a digital circuit (Dig) 54 that produces a mode selection signal PULSE for the LDO regulator 30. For instance, the mode selection signal PULSE may be asserted in response to the load L entering an active mode of operation (e.g., turning on), and de-asserted in response to the load L entering an inactive mode of operation (e.g., turning off).

As exemplified in FIG. 3, the LDO regulator 30 includes a mode selection (MS) circuit 300 configured to receive the mode selection signal PULSE from the load L. The mode selection circuit 300 receives a first input current $I_{PU}$ (e.g., a power-up current) from a first current generator 302 and a second input current $I_{PD}$ (e.g., a power-down current) from a second current generator 304. The LDO regulator 30 includes an additional power transistor (e.g., an n-channel power MOS transistor 306) having its current conduction path arranged between the output node 204 and the ground node 202, and controlled by a control signal CTR that is produced by the mode selection circuit 300 as a function of the mode selection signal PULSE, using the currents $I_{PU}$ and $I_{PD}$ to charge and discharge the gate of transistor 306. In particular, transistor 306 may have a drain terminal coupled to node 204, a source terminal coupled to node 202, and a gate terminal coupled to the output of the mode selection circuit 300 to receive the control signal CTR.

Therefore, in one or more embodiments a mode selection signal PULSE is received by the LDO regulator 30 in order to switch operation of the LDO regulator 30 from a low-power mode to a high-power mode (e.g., when the mode selection signal PULSE is asserted) and vice versa (e.g., when the mode selection signal PULSE is de-asserted). The mode selection circuit 300, using the input currents $I_{PU}$ (power-up) and $I_{PD}$ (power-down), controls (e.g., enables and disables) the power transistor 306 via the control signal CTR to modify the output stage of the LDO regulator 30, in order to provide smooth transitions from the low-current mode to the high-current mode (and vice versa), as well as low overshoot and/or low undershoot during the load current transients. When the LDO regulator 30 is switched to the high-current mode of operation, the load L can start drawing higher average current to perform the operation requested. At the end of the operation of the load L, the mode selection signal PULSE sets the LDO regulator 30 again in the low-current mode, so as to save power while waiting for a next request of operation by the load L. The high-power to low-power transition is dominated by the power-down current $I_{PD}$ that relaxes the mode selection circuit 300 turning off in order to prevent high overshoot, as further disclosed in the following.

Figure 4:
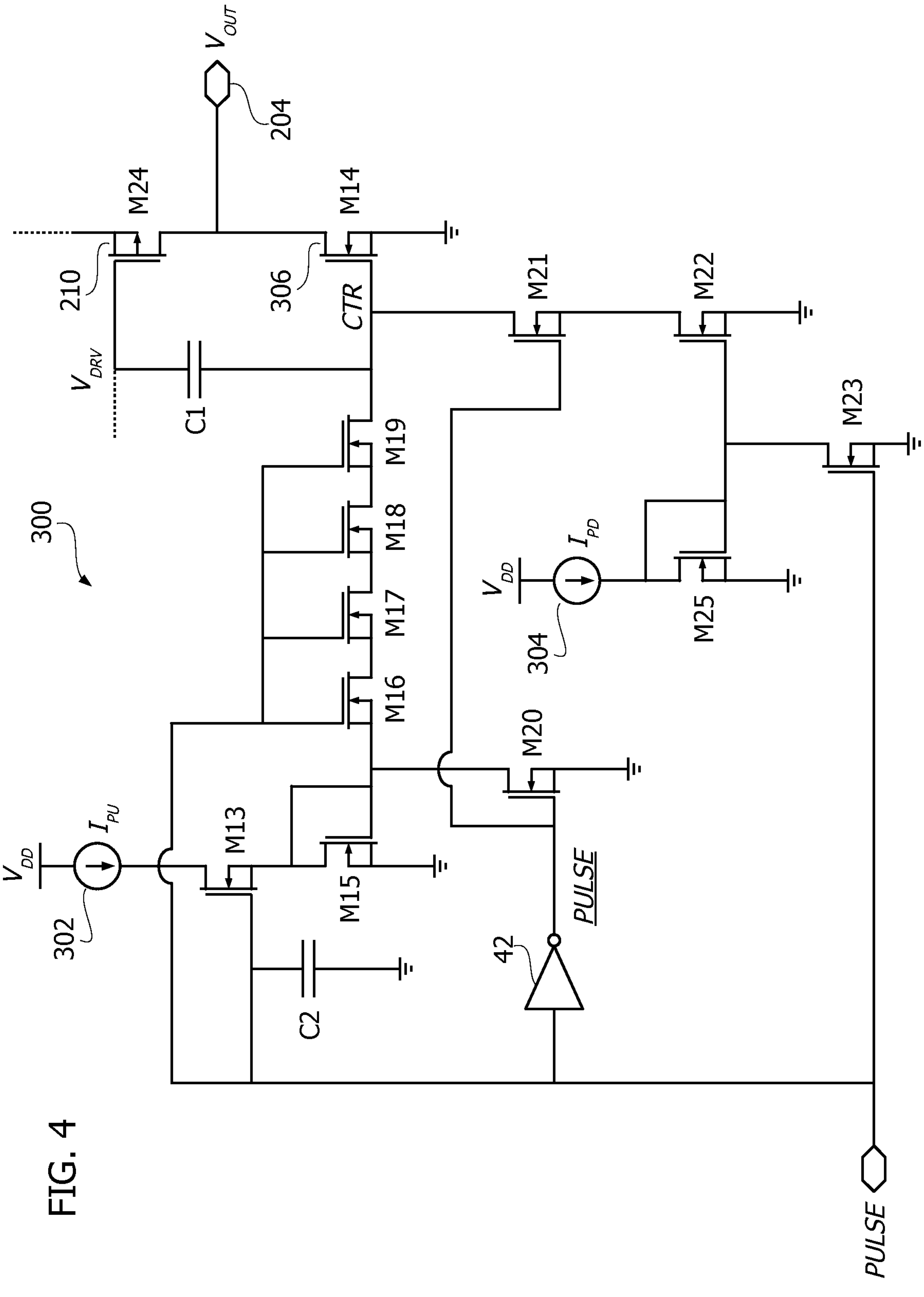
FIG. 4 is a circuit block diagram exemplary of implementation details of an LDO voltage regulator according to one or more embodiments of the present description.

FIG. 4 is a circuit diagram exemplary of a possible implementation of a mode selection circuit 300 according to one or more embodiments, and its coupling to the power transistor 306.

A first portion of circuit 300 operates as a power-up circuit for power transistor 306 (also indicated as transistor M14 in FIG. 4), e.g., it enables transitions from the low-power mode to the high-power mode of the LDO regulator 30. The power-up circuit includes a current conduction path that includes a current source 302 configured to source a current $I_{PU}$, a transistor M13 (e.g., an n-channel MOS transistor), and a transistor M15 (e.g., an n-channel MOS transistor) arranged in series between a supply voltage node that provides a supply voltage $V_{DD}$ and the ground node 202 at voltage $V_{GND}$. The current source 302 has a first terminal coupled to the supply voltage node and a second terminal coupled to the drain terminal of transistor M13. Transistor M13 has a source terminal coupled to the drain terminal of transistor M15, and a gate terminal configured to receive the mode selection signal PULSE from the load L. Transistor M15 has a source terminal coupled to the ground node 202, and a gate terminal coupled to its drain terminal (i.e., transistor M15 is diode-connected). Transistor M15 thus implements the first branch of a current mirror, the second branch being implemented by the output transistor M14 whose gate terminal is coupled to the gate terminal of transistor M15, as further disclosed in the following. A capacitor C2 (e.g., an integrated capacitor) may be coupled between the gate terminal of transistor M13 and the ground node 202. A capacitor C1 (e.g., an integrated capacitor) may be coupled between the gate terminal of transistor M14 and the gate terminal of transistor 210 (also indicated as transistor M24 in FIG. 4), i.e., the control terminal of the pass element of the LDO regulator 30, which is configured to receive the drive signal $V_{DRV}$. A series of transistors M16, M17, M18, M19 may be coupled between the gate terminal of transistor M15 and the gate terminal of transistor M14 to provide the gate-to-gate connection that implements a current mirror with transistors M14 and M15. In particular, transistors M16 to M19 may be n-channel MOS transistors, where: the source terminal of transistor M16 is coupled to the gate terminal of transistor M15, the source terminal of transistor M17 is coupled to the drain terminal of transistor M16, the source terminal of transistor M18 is coupled to the drain terminal of transistor M17, the source terminal of transistor M19 is coupled to the drain terminal of transistor M18, and the drain terminal of transistor M19 is coupled to the gate terminal of transistor M14. The gate terminals of transistors M16 to M19 may all be configured to receive the mode selection signal PULSE, and may thus implement a resistive chain between the gates of transistors M14 and M15 when the current mirror is active. It will be otherwise appreciated that the provision of transistors M16 to M19 between the gates of transistors M14 and M15 is not mandatory, and that the number of transistors M16 to M19 can vary in different embodiments (e.g., from zero to more than four).

A second portion of circuit 300 operates as a power-down circuit for power transistor 306 (also indicated as transistor M14 in FIG. 4), e.g., it enables transitions from the high-power mode to the low-power mode of the LDO regulator 30. The power-down circuit includes a current conduction path that includes a current source 304 configured to source a current $I_{PD}$ and a transistor M25 (e.g., an n-channel MOS transistor) arranged in series between the supply voltage node that provides the supply voltage $V_{DD}$ and the ground node 202 at voltage $V_{GND}$. The current source 304 has a first terminal coupled to the supply voltage node and a second terminal coupled to the drain terminal of transistor M25. Transistor M25 has a source terminal coupled to the ground node 202, and a gate terminal coupled to its drain terminal (i.e., transistor M25 is diode-connected). Transistor M25 thus implements the first branch of a current mirror, the second branch being implemented by a transistor M22 (e.g., an n-channel MOS transistor) whose gate terminal is coupled to the gate terminal of transistor M25. Transistor M22 has a source terminal coupled to the ground node 202 and a drain terminal coupled to the source terminal of a transistor M21 (e.g., an n-channel MOS transistor). Transistor M21 has a drain terminal coupled to the gate terminal of transistor M14, and a gate terminal configured to receive the complement PULSE of the mode selection signal PULSE, which is produced at the output terminal of an inverter circuit 42 that has its input terminal configured to receive the mode selection signal PULSE from the load L. A transistor M23 (e.g., an n-channel MOS transistor) is coupled between the gate terminals of transistors M25, M22 and the ground node 202. In particular, transistor M23 may have a drain terminal coupled to the gate terminals of transistors M25 and M22, a source terminal coupled to the ground node 202, and a gate terminal configured to receive the mode selection signal PULSE. A transistor M20 (e.g., an n-channel MOS transistor) is coupled between the gate terminal of transistor M15 and the ground node 202. In particular, transistor 20 may have a drain terminal coupled to the gate terminal of transistor M15, a source terminal coupled to the ground node 202, and a gate terminal configured to receive the complement PULSE of the mode selection signal PULSE from inverter 42.

The mode selection circuit 300 exemplified in FIG. 4 may thus operate as disclosed in the following.

When implementing a low-power mode to high-power mode transition, the mode selection signal PULSE is asserted (e.g., set to a high logic value, '1') by the load L (e.g., it turns on as directed, for example, by the digital circuit 54)). Transistor M13 is turned on by signal PULSE, as well as the series-connected transistors M16, M17, M18, M19 of the resistive chain between the gate terminals of transistors M15 and M14. Therefore, the current mirror composed by transistors M15 and M14 is enabled together with the resistive chain, so as to relax the turn-on phase of transistor M14 (e.g., gradually and/or slowly turning on transistor M14) and prevent large undershoot of the output voltage $V_{OUT}$. Indeed, if transistor M14 were turned on quickly, the related current demand from the output node 204 would be sustained only by the output bypass capacitor $C_L$ possibly resulting in a large undershoot. To the contrary, in one or more embodiments as disclosed herein, the rising time of the mirrored current (i.e., the current flowing through transistor M14, which may be for instance in the vicinity of 10 μA) is rather long, thus allowing the error amplifier 208 to settle at its operating point, with the mirror current being provided by both the output capacitor $C_L$ and the pass element M24 (210). The undershoot of the output voltage $V_{OUT}$ is therefore controlled. Still during a low-power mode to high-power mode transition, transistor M23 is turned on and brings the gate terminals of transistors M25 and M22 to the ground voltage $V_{GND}$, thereby turning off the mirror composed by transistors M25 and M22, whose operation is useful (only) during the high-power mode to low-power mode transitions to turn off the mode selection circuit 300. Still during a low-power mode to high-power mode transition, a p-channel MOS transistor arranged in parallel with the one that biases the input differential pair of the error amplifier 208 may additionally be turned on by the mode selection signal PULSE, in order to increase the bias current of the differential pair and therefore the bandwidth of the whole amplifier (e.g., operational transconductance amplifier, OTA). Increasing the current consumption of the first and second stage results in both the first and second pole being split at higher frequencies, therefore maintaining the phase margin higher than the critic threshold.

Therefore, in one or more embodiments during a low-power mode to high-power mode transition, and in particular during the current demands from the load L, the amplifier 208, which has become faster, tends to settle quickly so that the undershoot is controlled (e.g., the output voltage $V_{OUT}$ is maintained above 1 V). When the load L stops its current demand, the extra current provided by the pass element 210 (e.g., by transistor M24) is split in two parts, one flowing through transistor M14 and the other one (which is smaller) flowing through the output capacitor, instead of flowing entirely through capacitor $C_L$. In this way, the overshoot is controlled (e.g., the output voltage $V_{OUT}$ is maintained below 1.32 V).

When implementing a high-power mode to low-power mode transition, the mode selection signal PULSE is de-asserted (e.g., set to a low logic value, '0') by the load L (e.g., it turns off as directed, for example, by the digital circuit 54). Transistors M20 and M21 are turned on (e.g., activated) by signal PULSE. Transistor M20 operates as a switch that, when activated, ties the gate terminal of transistor M15 to the ground voltage $V_{GND}$, and therefore turns off transistor M14 (e.g., the amplifier operates again as a class A amplifier). Transistor M21 enables a low-impedance path from the gate of transistor M14 to the ground node. Still during a high-power mode to low-power mode transition, the current mirror including transistors M25 and M22 turns on, insofar as transistor M23 is now turned off. The current flowing through transistor M22 is determined by the mirror factor and by the magnitude of the power-down current $I_{PD}$ provided by the current source 304, thus the parasitic (gate) capacitance of transistor M14 is discharged at a controlled rate determined by a constant and/or programmable current $I_{PD}$. In this way, transistor M14 can be turned off slowly. In the absence of such a current control during the discharge phase of the gate capacitance of transistor M14, the turn-off phase of transistor M14 would result in an over-current and, consequently, an overshoot of the output voltage $V_{OUT}$.

Therefore, one or more embodiments as disclosed herein may provide a fully integrated (e.g., fully on-chip) LDO regulator that is capable to prevent large overshoot and undershoot with small integrated capacitances (e.g., in the range of 0.5 nF to 1.5 nF, three orders of magnitude smaller than the capacitances of conventional solutions that rely on external capacitors). Additionally, operation of an LDO regulator as disclosed herein may be stable with a starting load current of 0 A.

One or more embodiments may thus provide the following performance: output capacitance (e.g., integrated) in the range of 0.5 nF to 1.5 nF, without the need of providing chip pads of connecting an external output capacitor; current consumption in the low-power operation mode of about 0.15 μA; current consumption in the high-power operation mode of about 25 μA; duration of the transient from the low-power operation mode to the high-power operation mode of about 250 μs, and overshoot and/or undershoot limited to about 100 mV.

Without prejudice to the underlying principles, the details and embodiments may vary, even significantly, with respect to what has been described by way of example only, without departing from the extent of protection.

The claims are an integral part of the technical teaching provided herein in respect of the embodiments.

The extent of protection is determined by the annexed claims.

The invention claimed is:

1. A circuit, comprising:

a voltage regulator circuit configured to generate a regulated voltage at an output node;

a transistor coupled between the output node and a reference node; and a mode selection circuit coupled to a control terminal of the transistor and including a first current source and a second current source, the mode selection circuit configured to: control the transistor to sink a current mirrored from a current output of the first current source from said output node to the reference node in response to a first logic state of a mode control signal, and sink a current mirrored from a current output of the second current source from the control terminal of the transistor in response to a second logic state of the mode control signal in order to turn off said transistor at a controlled rate.

2. A circuit, comprising:

a voltage regulator circuit configured to generate a regulated voltage at an output node;

a transistor coupled between the output node and a reference node; and a mode selection circuit coupled to a control terminal of the transistor and configured to: control the transistor to sink a current with a controlled magnitude from said output node to the reference node in response to a first logic state of a mode control signal, and sink a current with a controlled magnitude from the control terminal of the transistor in response to a second logic state of the mode control signal in order to turn off said transistor at a controlled rate;

wherein said mode selection circuit comprises:

a first current conduction path including a first current source configured to source a first current, said first current conduction path enabled in response to the first logic state of the mode control signal;

wherein said first current conduction path is coupled in a first current mirroring relationship with the transistor.

3. The circuit of claim 2, wherein said mode selection circuit further comprises:

a second current conduction path including a second current source configured to source a second current, said second current conduction path enabled in response to the second logic state of the mode control signal;

wherein said second current conduction path is coupled in a second current mirroring relationship with a sinking transistor; and wherein said sinking transistor is coupled to the control terminal of the transistor.

4. The circuit of claim 2, wherein the first current mirroring relationship includes coupling transistors connected in series with the control terminal of the transistor, said coupling transistors having control terminals configured to be switched to a conductive state in response to the first logic state of the mode control signal.

5. The circuit of claim 2, further comprising a control circuit configured to generate said mode control signal.

6. The circuit of claim 5, wherein said control circuit asserts the mode control signal in the first logic state in response to a transition of the voltage regulator circuit from a low-power mode to a high-power mode with respect to a load coupled to the output node.

7. The circuit of claim 6, wherein said control circuit deasserts the mode control signal in the second logic state in response to a transition of the voltage regulator circuit from the high-power mode to the low-power mode with respect to the load coupled to the output node.

8. A method, comprising:

producing a regulated output voltage at an output node; and selectively controlling a transistor coupled between the output node and a reference node;

wherein selectively controlling comprises:

controlling the transistor to sink a current mirrored from a current output of a first current source from said output node to the reference node in response to a first logic state of a mode control signal; and sinking a current mirrored from a current output of a second current source from a control terminal of the transistor in response to a second logic state of the mode control signal in order to turn off said transistor at a controlled rate.

9. A circuit, comprising:

a first input terminal and a second input terminal configured to receive an input voltage therebetween;

a first output terminal and a second output terminal configured to produce a regulated output voltage therebetween, wherein the second input terminal and the second output terminal are coupled to a ground node;

a feedback network configured to produce a feedback voltage indicative of the regulated output voltage;

an error amplifier configured to produce a drive signal as a function of a difference between said feedback voltage and a reference voltage;

a pass element arranged between said first input terminal and said first output terminal, wherein a conductivity of said pass element is modulated as a function of said drive signal;

an output transistor arranged between said first output node and said ground node; and a mode selection circuit configured to receive a mode selection signal and control said output transistor as a function thereof, wherein:

in response to assertion of said mode selection signal, said mode selection circuit controls turn on said output transistor to sink a current mirrored from a current output of a first current source from said first output node; and in response to de-assertion of said mode selection signal, said mode selection circuit sinks a current mirrored from a current output of a second first current source from a control terminal of said output transistor to control turn off said output transistor at a controlled rate.

10. The circuit of claim 9, wherein said mode selection signal is asserted in response to a transition from a low-power mode to a high-power mode with respect to a load coupled between the first output terminal and the second output terminal.

11. The circuit of claim 10, wherein said mode selection signal is de-asserted in response to a transition from the high-power mode to the low-power mode with respect to the load coupled between the first output terminal and the second output terminal.

12. A circuit, comprising:

a first input terminal and a second input terminal configured to receive an input voltage therebetween;

a first output terminal and a second output terminal configured to produce a regulated output voltage therebetween, wherein the second input terminal and the second output terminal are coupled to a ground node;

a feedback network configured to produce a feedback voltage indicative of the regulated output voltage;

an error amplifier configured to produce a drive signal as a function of a difference between said feedback voltage and a reference voltage;

a pass element arranged between said first input terminal and said first output terminal, wherein a conductivity of said pass element is modulated as a function of said drive signal;

an output transistor arranged between said first output node and said ground node; and a mode selection circuit configured to receive a mode selection signal and control said output transistor as a function thereof, wherein:

in response to assertion of said mode selection signal, said mode selection circuit controls turn on said output transistor to sink a current with a controlled magnitude from said first output node; and in response to de-assertion of said mode selection signal, said mode selection circuit sinks a current with a controlled magnitude from a control terminal of said output transistor to turn off said output transistor at a controlled rate;

wherein said mode selection circuit comprises a first current conduction path including a first current source configured to source a first current, an enabling transistor, and a diode-connected transistor arranged in series between a power supply node and said ground node, wherein said enabling transistor is switched to a conductive state in response to assertion of said mode selection signal and switched to a non-conductive state in response to de-assertion of said mode selection signal, and wherein said diode-connected transistor and said output transistor are coupled to form a current mirror.

13. The circuit of claim 12, wherein said mode selection circuit comprises one or more coupling transistors with current conduction paths arranged in series between a control terminal of said diode-connected transistor and a control terminal of said output transistor, wherein said one or more coupling transistors are switched to a conductive state in response to assertion of said mode selection signal and switched to a non-conductive state in response to de-assertion of said mode selection signal.

14. The circuit of claim 12, wherein said mode selection circuit further comprises a capacitor coupled between a control terminal of said enabling transistor and said ground node.

15. The circuit of claim 12, wherein said mode selection circuit further comprises a gate-controlling transistor having a current conduction path arranged between a control terminal of said diode-connected transistor and said ground node, wherein said gate-controlling transistor is controlled in response to a complement of said mode selection signal, wherein the gate-controlling transistor is switched to a conductive state in response to de-assertion of said mode selection signal and switched to a non-conductive state in response to assertion of said mode selection signal.

16. A circuit, comprising:

a first input terminal and a second input terminal configured to receive an input voltage therebetween;

a first output terminal and a second output terminal configured to produce a regulated output voltage therebetween, wherein the second input terminal and the second output terminal are coupled to a ground node;

a feedback network configured to produce a feedback voltage indicative of the regulated output voltage;

an error amplifier configured to produce a drive signal as a function of a difference between said feedback voltage and a reference voltage;

a pass element arranged between said first input terminal and said first output terminal, wherein a conductivity of said pass element is modulated as a function of said drive signal;

an output transistor arranged between said first output node and said ground node; and a mode selection circuit configured to receive a mode selection signal and control said output transistor as a function thereof, wherein:

in response to assertion of said mode selection signal, said mode selection circuit controls turn on said output transistor to sink a current with a controlled magnitude from said first output node; and in response to de-assertion of said mode selection signal, said mode selection circuit sinks a current with a controlled magnitude from a control terminal of said output transistor to turn off said output transistor at a controlled rate;

wherein said mode selection circuit comprises a current mirror arrangement configured to selectively sink a second current from said control terminal of said output transistor in response to de-assertion of said mode selection signal.

17. The circuit of claim 16, wherein said mode selection circuit comprises a further enabling transistor having a current conduction path arranged between said current mirror arrangement and said control terminal of said output transistor, wherein said further enabling transistor is configured to receive a complement of said mode selection signal, wherein the further enabling transistor is switched to a conductive state in response to de-assertion of said mode selection signal and switched to a non-conductive state in response to assertion of said mode selection signal.

18. The circuit of claim 16, wherein said mode selection circuit comprises a further gate-controlling transistor having a current conduction path arranged between a control terminal of said current mirror arrangement and said ground node, wherein said further gate-controlling transistor is configured to receive said mode selection signal, wherein the further gate-controlling transistor is switched to a conductive state in response to assertion of said mode selection signal and switched to a non-conductive state in response to de-assertion of said mode selection signal.

19. A circuit, comprising:

a first input terminal and a second input terminal configured to receive an input voltage therebetween;

a first output terminal and a second output terminal configured to produce a regulated output voltage therebetween, wherein the second input terminal and the second output terminal are coupled to a ground node;

a feedback network configured to produce a feedback voltage indicative of the regulated output voltage;

an error amplifier configured to produce a drive signal as a function of a difference between said feedback voltage and a reference voltage;

a pass element arranged between said first input terminal and said first output terminal, wherein a conductivity of said pass element is modulated as a function of said drive signal;

an output transistor arranged between said first output node and said ground node; and a mode selection circuit configured to receive a mode selection signal and control said output transistor as a function thereof, wherein:

in response to assertion of said mode selection signal, said mode selection circuit controls turn on said output transistor to sink a current with a controlled magnitude from said first output node; and in response to de-assertion of said mode selection signal, said mode selection circuit sinks a current with a controlled magnitude from a control terminal of said output transistor to turn off said output transistor at a controlled rate;

a capacitor coupled between the control terminal of said output transistor and a control terminal of said pass element; and an output capacitor coupled between said first output node and said second output node.

20. A method of operating a voltage regulator circuit, comprising:

receiving an input voltage between a first input terminal and a second input terminal;

producing a regulated output voltage between a first output terminal and a second output terminal;

producing a feedback voltage indicative of the regulated output voltage at a feedback network;

producing a drive signal as a function of a difference between said feedback voltage and a reference voltage at an error amplifier;

applying said drive signal to control modulation of a conductivity of a pass element as a function of said drive signal;

receiving a mode selection signal and controlling an output transistor as a function of said mode selection signal;

wherein controlling comprises:

in response to assertion of said mode selection signal, turning on said output transistor to sink a current mirrored from a current output of a first current source from said first output terminal; and in response to de-assertion of said mode selection signal, sinking a current mirrored from a current output of a second current source from a control terminal of said output transistor to turn off said output transistor at a controlled rate.

* * * * *